(12) United States Patent
Schoendorfer

(10) Patent No.: US 9,790,100 B2
(45) Date of Patent: Oct. 17, 2017

(54) GRAYWATER SEPARATION DEVICE

(71) Applicant: KKJ, INC., Valley Center, CA (US)

(72) Inventor: Don Schoendorfer, Santa Ana, CA (US)

(73) Assignee: Jennifer K. McLaughlin, Trustee of the Jennifer K. McLaughlin Trust, Escondido, CA (US)

( * ) Notice: Subject to any disclaimer, the term of this patent is extended or adjusted under 35 U.S.C. 154(b) by 358 days.

(21) Appl. No.: 14/555,319

(22) Filed: Nov. 26, 2014

(65) Prior Publication Data

US 2015/0175440 A1 Jun. 25, 2015

Related U.S. Application Data

(63) Continuation of application No. PCT/US2013/043418, filed on May 30, 2013.
(Continued)

(51) Int. Cl.
*C02F 1/00* (2006.01)
*C02F 1/38* (2006.01)
*B01D 29/01* (2006.01)
*B01D 63/16* (2006.01)
*B01D 21/00* (2006.01)
(Continued)

(52) U.S. Cl.
CPC .......... *C02F 1/001* (2013.01); *B01D 21/0006* (2013.01); *B01D 21/0012* (2013.01); *B01D 29/014* (2013.01); *B01D 63/16* (2013.01); *B01D 65/08* (2013.01); *C02F 1/004* (2013.01); *C02F 1/38* (2013.01); *B01D 2321/2041* (2013.01); *C02F 2103/002* (2013.01); *C02F 2209/006* (2013.01); *C02F 2209/008* (2013.01); *C02F 2209/05* (2013.01); *C02F 2209/06* (2013.01); *C02F 2209/09* (2013.01); *C02F 2209/40* (2013.01); *C02F 2303/24* (2013.01); *E03B 1/042* (2013.01)

(58) Field of Classification Search
CPC .. C02F 1/001; C02F 1/004; C02F 1/38; C02F 2209/40; C02F 2103/002; C02F 2203/24; B01D 29/014; B01D 63/16; B01D 2321/2041
See application file for complete search history.

(56) References Cited

U.S. PATENT DOCUMENTS 4,790,942 A * 12/1988 Shmidt .................... B01D 9/00
210/321.63
7,425,265 B2 * 9/2008 Schoendorfer ...... B01D 29/117
210/321.63
(Continued)

OTHER PUBLICATIONS

The International Search Report for PCT/US2013/043418, dated Nov. 29, 2013.*
(Continued)

*Primary Examiner* — David A Reifsnyder
(74) *Attorney, Agent, or Firm* — Knobbe Martens Olson & Bear LLP

(57) ABSTRACT

Embodiments of the present disclosure are directed to a device and method for the filtration of gray water from a household. In some embodiments, the gray water can be filtered using a conical rotor and filtration media, which can provide enhanced filtration through the use of Taylor vorticity filtration. The filtered water can have various uses back in the household after filtration.

7 Claims, 16 Drawing Sheets

Related U.S. Application Data

(60) Provisional application No. 61/654,735, filed on Jun. 1, 2012.

(51) Int. Cl.
*B01D 65/08* (2006.01)
*C02F 103/00* (2006.01)
*E03B 1/04* (2006.01)

(56) References Cited

U.S. PATENT DOCUMENTS

| | | | |
|---|---|---|---|
| 8,834,716 B2 * | 9/2014 | Parkinson | C02F 1/004 |
| | | | 210/512.1 |
| 2011/0180495 A1 * | 7/2011 | Schoendorfer | A61M 1/16 |
| | | | 210/791 |

OTHER PUBLICATIONS

The International Preliminary Report on Patentability for PCT/US2013/043418, dated Dec. 2, 2014.*

* cited by examiner

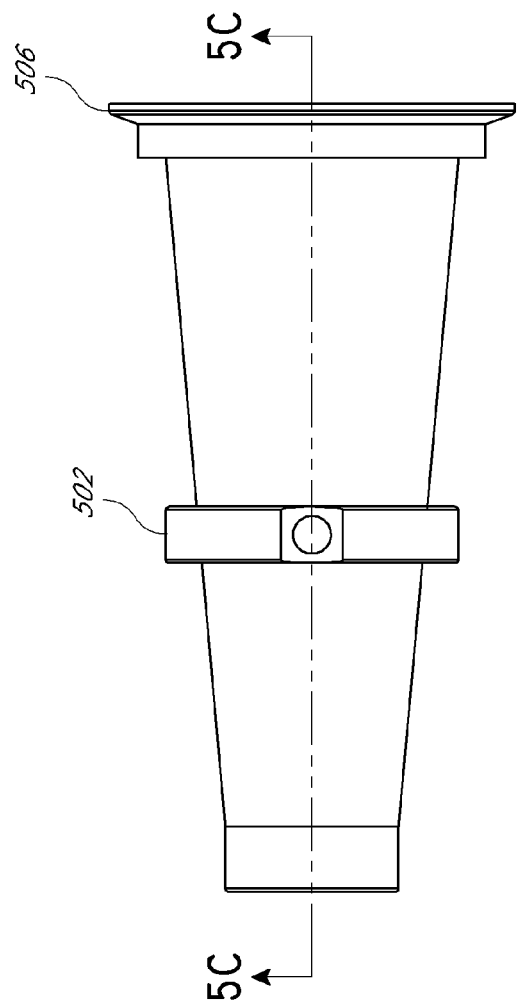
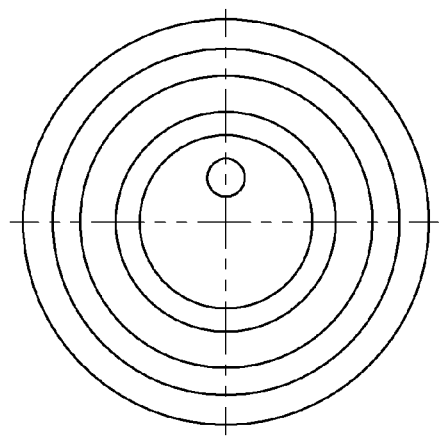
FIG. 5B
FIG. 5A

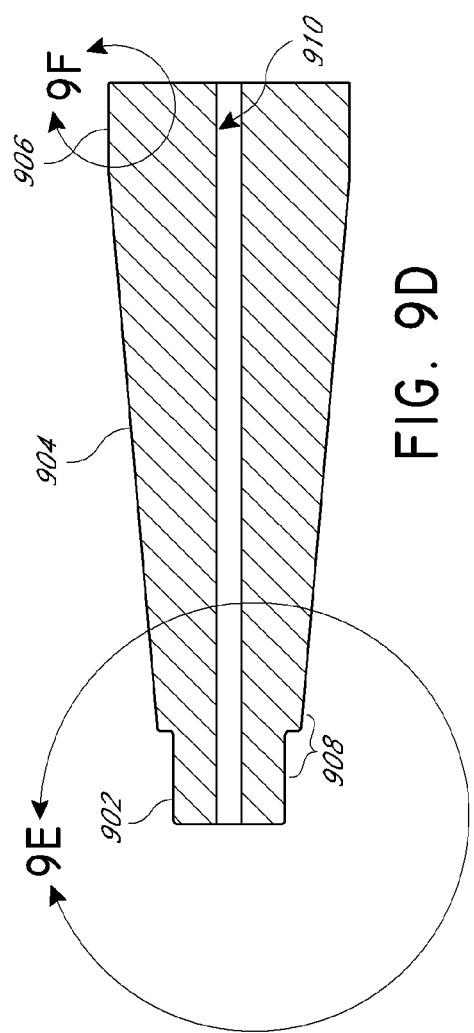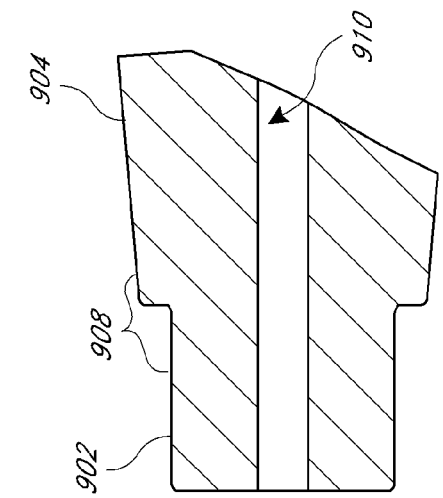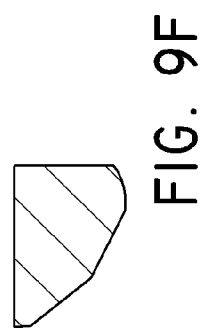
FIG. 9D
FIG. 9E
FIG. 9F

GRAYWATER SEPARATION DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

CROSS-REFERENCE TO RELATED APPLICATIONS

This application claims priority to U.S. Provisional Application No. 61/654,735, filed on Jun. 1, 2012. This application is related to U.S. Pat. No. 7,425,265, U.S. Pat. No. 7,220,354, U.S. Pat. No. 7,374,677, and U.S. Publication No. 2011/0190495, all of which are incorporated by reference herein in their entireties.

BACKGROUND

Field

Aspects of the present disclosure relate to using a conical-shaped rotor inside a conical-shaped housing to perform Taylor vorticity-enhanced filtration of gray water.

Description of the Related Art

One of the challenges in any type of filtration process, including filtration of gray water, is filter clogging, scientifically described as "concentration polarization." As a result of the selective permeability properties of the filtration membrane, the filtered material that cannot pass through the membrane becomes concentrated on the surface of the membrane. This phenomenon is illustrated in the case of a "dead-end" filter, such as a coffee filter. During the course of the filtration process, the filtered material (coffee grounds) building up on the filter creates flow resistance to the filtrate, the fluid (coffee), which can pass through the filter. Consequently, filtrate flux is reduced and filtration performance diminishes.

Various solutions to the problem of concentration polarization have been suggested. These include: increasing the fluid velocity and/or pressure (Merin et al., (1980) *J. Food Proc. Pres.* 4(3):183-198); creating turbulence in the feed channels (Blatt et al., *Membrane Science and Technology*, Plenum Press, New York, 1970, pp. 47-97); pulsing the feed flow over the filter (Kennedy et al., (1974) *Chem. Eng. Sci.* 29:1927-1931); designing flow paths to create tangential flow and/or Dean vortices (Chung et al., (1993) *J. Memb. Sci.* 81:151-162); and using rotating filtration to create Taylor vortices (see e.g., Lee and Lueptow (2001) *J. Memb. Sci.* 192:129-143 and U.S. Pat. Nos. 5,194,145, 4,675,106, 4,753,729, 4,816,151, 5,034,135, 4,740,331, 4,670,176, and 5,738,792), all of which are incorporated herein in their entirety by reference thereto).

One application of the Taylor vorticity-enhanced filtration technology (herein referred to as "T-V technology") is in the separation of human blood into cell free plasma and concentrated blood cells. The concentrated blood cells are returned to the blood donor. The cell free plasma is the commercially desired product. In some applications, the T-V technology device may operate for about 30 minutes and may then be discarded. Due to its relatively short duration of use, costs that come with the needs of longevity are avoided, and the device can be made at minimum expense. The relatively high worth of the harvested human blood cell free plasma helps to justify the cost of the single use device.

In some T-V technology used for blood separation, the filter media is on a rotor, and because of this, a rotary fluid transport seal is used. This rotary fluid transport seal allows extraction of the filtered plasma, which is rotating with the rotor, to transit to the stationary case. An inexpensive rotary fluid transport seal works well in the whole blood separation application because it only needs to operate for 30 minutes or so. However, having a rotary seal survive for years of service may be considerably more demanding and expensive.

SUMMARY

In one embodiment, a system for the filtration of gray water can comprise a filtration unit. The filtration unit can comprise a housing comprising a removable cap, an inlet port, a retentate output port and a filtrate output port, the housing further comprising a filter disposed along at least a portion of an inner wall of the housing. The filtration unit can further comprise a rotor coupled to a rotational drive means, and configured to rotate within the housing. The filtration unit can further comprise a gap between the housing and the rotor, such that rotation of the rotor within the housing generates Taylor vortices within the gap.

In another embodiment, gray water can be filtered by collecting gray water and transporting the gray water into a filtration device. The filtration device can comprise a conical housing comprising a filter, a rotor coupled to a rotational drive means, and configured to rotate within the housing, and a gap between the housing and the rotor, such that rotation of the rotor within the housing generates Taylor vortices within the gap, such Taylor vortices being sufficient to reduce filter clogging during filtration. The gray water can then be filtered while rotating the rotor within the housing, and transported to a fixture, reservoir, or system configured to utilize or store the filtered gray water.

In another embodiment, a filtration device can comprise a conical housing comprising a removable cap, an inlet port, a retentate output port and a filtrate output port, the housing further comprising a filter disposed along at least a portion of an inner wall of the housing; a motor configured to rotate a drive shaft; a conical rotor coupled to the drive shaft, and configured to rotate within the conical housing; and a gap between the housing and the rotor, such that rotation of the rotor within the housing generates Taylor vortices within the gap.

BRIEF DESCRIPTION OF THE DRAWINGS

FIGS. 5A-E illustrate different viewpoints of an embodiment of a housing for the filtration device.

FIGS. 9A-F illustrate different viewpoints of an embodiment of a rotor.

DETAILED DESCRIPTION

Figure 1:
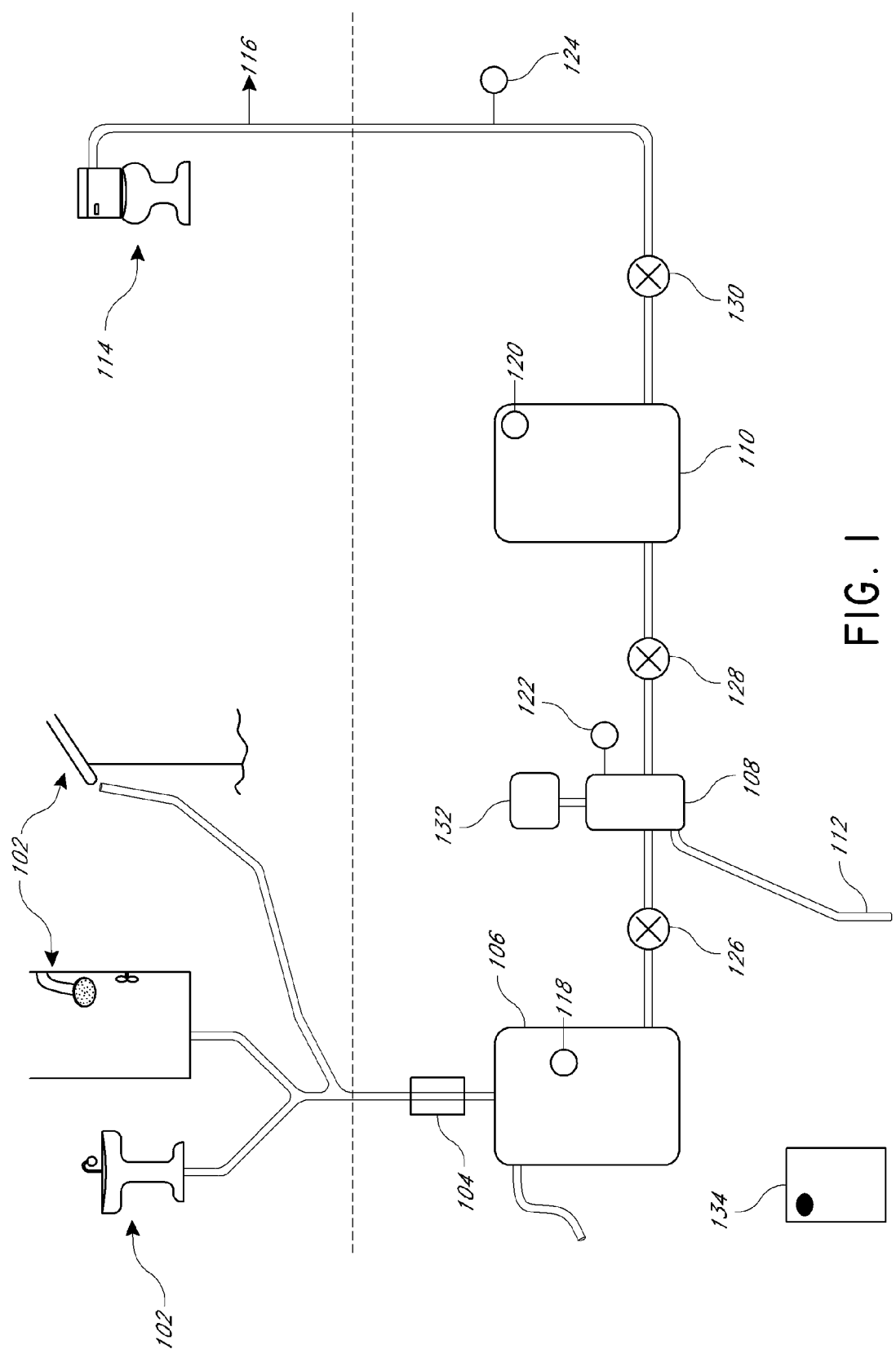
FIG. 1 illustrates a schematic diagram of an embodiment of a gray water filtration system.

Embodiments of the present disclosure provide a gray water filtration device containing a Taylor vorticity-filtration device. Taylor vortices, also referred to herein as Taylor vorticity, can increase the mass transfer through a filter by one or two orders of magnitude. This is useful where it is desirable to remove a component of a fluid by size separation from a feed fluid. In particular, the filtration device can use Taylor vortices to filter and/or clean used water so that it can be put back to use in a home or other area.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, or within less than 0.01% of the stated amount.

The term "conical" as used herein is a broad term and includes its ordinary dictionary definition. In some embodiments, conical means that the radius varies along an axis.

Filtration can be used in the treatment of gray water. The term "gray water," as used herein, is a broad term and includes its ordinary dictionary meaning. In some embodiments, gray water may include used water from bathroom sinks, showers and tubs, or from roof run-off from rain, for example.

In general, embodiments of the present disclosure comprise a Taylor-vorticity filtration device for filtration of gray water, and methods of filtering the gray water using the device. Embodiments of a Taylor vorticity-filtration device can be used to filter and recycle gray water from, for example, households and businesses. The filtration device could also be used to filter gray water from apartment complexes, or larger city blocks.

In some embodiments, the filtration device can comprise a filter element which filters gray water with the assistance of the Taylor vorticity-filtration. The filtered gray water can then be pumped back into the household or business for use in activities such as, for example, irrigation, toilet flushing, and some general washing.

Taylor vortices can be induced in the gap between coaxially arranged cylindrical members when the inner member is rotated relative to the outer member. Taylor-Couette filtration devices generate strong vorticity as a result of centrifugal flow instability ("Taylor instability"), which serves to mix the filtered material concentrated along the filter back into the fluid to be processed. Typically, a cylindrical filter is rotated within a stationary outer housing. It has been observed that membrane fouling due to concentration polarization is very slow compared to dead-end or tangential filtration. Indeed, filtration performance may be improved by approximately one hundred fold.

A Taylor number is a dimensionless number that relates centrifugal forces to viscous forces. When inducing fluid flow through a gap between a spinning rotor and a stationary case, at some rotational speed, centrifugal forces become powerful enough to cause vorticity in the gap. There are various formulas for the Taylor number. For example, from page 500 of Boundary Layer Theory by H. Schlichting 6$^{th}$ ed., 1968 (McGraw-Hill), hereby incorporated by reference in its entirety:

$$\text{Taylor number} = (\text{velocity of the rotor}) \times (\text{gap}) \times (\text{gap}/\text{radius of rotor})^{1/2} / \text{Kinematic viscosity}$$

Where the kinematic viscosity of water is 1.0 centiStoke, $1\times10^{-6}$ m$^2$/sec, $1\times10^{-2}$ cm$^2$/sec, or 1 mm$^2$/sec.

In some embodiments, vorticity can begin when the Taylor number exceeds, for example, 30, 35, 40, 45, or 50. In some embodiments, vorticity may begin when the Taylor number exceeds 41.3.

In some applications of filtration utilizing T-V technology, there is a desire to keep the device operating for extended periods, such as, for example, multiple years. In some filtration applications, where the device is operated long enough, the filtration media may become clogged by components of the input fluid being processed. If the value of the processed fluid cannot justify a completely disposable T-V technology device, then for financial reasons, the T-V technology as described above may not be a viable option.

In certain applications, the filter unit may need to be replaced for various reasons, but replacement costs of the device are preferably low. This may occur in applications where the device is used for extended periods and where the feed fluid contains substances that will eventually clog the membrane. One example is in processing gray water for basic use such as a source of water for toilets, or for irrigation.

Common practice in the industry is to discard gray water. With the growing cost of water, and even sometimes the unavailability of water regardless of cost, there is a desire to provide methods to process this gray water so it may be used for other purposes, such as for flushing toilets and irrigating landscapes. Systems to do this could range in size, for example, appropriate for individual households, neighboring housing groups, apartments, commercial buildings, and factories small to large.

FIG. 1 shows a schematic diagram of an embodiment of a gray water filtration system. Gray water from, for example, a sink, shower or roof drainage 102, can be collected and directed through a coarse pre-filter 104 and then on to a first holding reservoir 106. The pre-filter 104 can remove large particles and debris such as, for example, toothpaste tube caps, hair, broken teeth, or the like. The pre-filter 104 can also use T-V filtration to remove some of the debris from the gray water prior to a subsequent filtering. Any number of pre-filters 104 can be used, for example subsequently smaller and smaller filters can be used to slowly remove generally large sized particles.

The reservoir 106 can be sized to collect gray water for a given period of time. For example, in some embodiments, the reservoir 106 can be sized to hold a day, a week, or a month's worth of gray water. In some embodiments, the reservoir 106 can be generally small and hold minimal water and merely act as a holding container for a brief time between filtrations. From reservoir 106, the gray water can be transported to a T-V filtration device 108, which is further described below. The device 108 can separate components larger than a certain size, for example about 50 or 100 μm, as determined by the particular filter media employed. The filter size is not limiting. A plurality of T-V filtration devices 108 can be used with subsequently smaller sized filter media to progressively filter the gray water. After filtering, the gray water can then be transported to a second reservoir 110. In some embodiments, the waste 112 can be discarded from the T-V filtration device 108. In some embodiments, the waste 112 can be discarded from the second reservoir 110 or during transportation from the T-V filtration device 108 to the second reservoir 110. In other embodiments, the waste 112 can be discarded prior to the gray water entering the T-V filtration device 108. After removal of the concentrated waste 112, the filtered gray water can be transported to devices or systems, such as for example, toilets 114, where gray water can be used for flushing instead of fresh water. The filtered gray water can also be directed to an irrigation system 116. The gray water can be directed to any desired location and the location and use is not limiting.

FIG. 1 further illustrates an embodiment of a gray water filtration system using multiple sensors. In some embodiments, sensor 118 and sensor 120 can monitor the level of water in the two reservoirs, 106 and 110 respectively. Sensor 122 can monitor the pressure, such as trans-membrane pressure, in the filtration unit 108 to prevent over or under pressurization. Preferably, the pressure can be maintained between about 10 and 200 mm Hg above the water pressure of the system if there was no device 108 in place. In some embodiments, the pressure is maintained at about 100 mm Hg. In some embodiments, the pressure can vary during operation. Accordingly, pressure is not particularly limiting. Sensor 124 can monitor the pressure of the outflow filtered gray water being directed into a home. In other embodiments, a lower or higher number of sensors may be used. The sensors can be used to monitor properties of the gray water such as, for example, pressure, filtration success, volume, viscosity, conductivity, opacity, microbe contamination, biological materials, ionic strength, pH, etc, any properties of aqueous solutions for which sensing technology exists can be monitored.

The embodiment of FIG. 1 also illustrates multiple pumps in the gray water filtration system. In some embodiments, two pumps can be used to transfer gray water from reservoir 106 to the T-V filtration device 108 (pump 126) and from the T-V filtration device 108 to the second reservoir 110 (pump 128). Pump 130 can be used to move the gray water from reservoir 110 out for use, such as in toilets 114 or out to the landscape through irrigation system 116. In other embodiments, a lower or higher number of pumps may be used. The pressure of the pumps is also not limiting. In some embodiments, gravity, either alone or in combination with one or more pumps, can be used move water within the system, as well as into and out of the system.

FIG. 1 further illustrates a motor 132. The motor 132 can be used to drive the rotor in the filtration unit 108, as further described below. In some embodiments, an electronic controller 134 can be used. In embodiments with an electronic controller, the electronic controller 134 can receive inputs from the various sensors and control the pumps and the motors in the system. The electronic controller 134 is not limiting and can be, for example, a computer system, code for a computer program, a physical remote control, or other devices capable of sending and receiving signals. The electronic controller 134 can be, for example, connected wirelessly and may contain an antenna in some embodiments. In other embodiments, the controller 134 can be wire connected to the system, including the pumps, motor, and/or sensors. In some embodiments, the controller 134 can be used to actuate valves throughout the filtration unit filtration system, such as, for example, in the filtration device 108 and the reservoir 110. In some embodiments, the controller 134 can control optional pumps to distribute filtered gray water among, for example, toilet fixtures 114 and irrigation systems 116. In some embodiments, the controller 134 can be programmed to prioritize filtered gray water allocation among end uses. For example, the controller 134 can prioritize filling the toilets 114 prior to sending gray water to the irrigation system 116, or vice versa. In some embodiments, the controller 134 can be programmed to supplement the filtered gray water with an amount of fresh water sufficient to meet an end user's demands.

The components described above need not all be used. In certain embodiments, some of these components can be removed, depending on the placement of the reservoirs and the final destination of the gray water. In other embodiments, additional components can be used. In some embodiments, gravity may be used to replace the pumps. For example, in a home containing a basement, waste gray water can flow to reservoir 106 by gravity, without using a pump. In other embodiments, a third reservoir (not illustrated), possibly with a smaller volume than the other reservoirs, could accept waste gray water from a sink, shower, or rainwater 102 prior to the first filter 104. An additional pump could then pump the gray water from the third reservoir to reservoir 106, which could be located on the same level as a home's toilets and shower. In some embodiments, the filtration system could be located in an attic space, or in any other part of the house.

Figure 2:
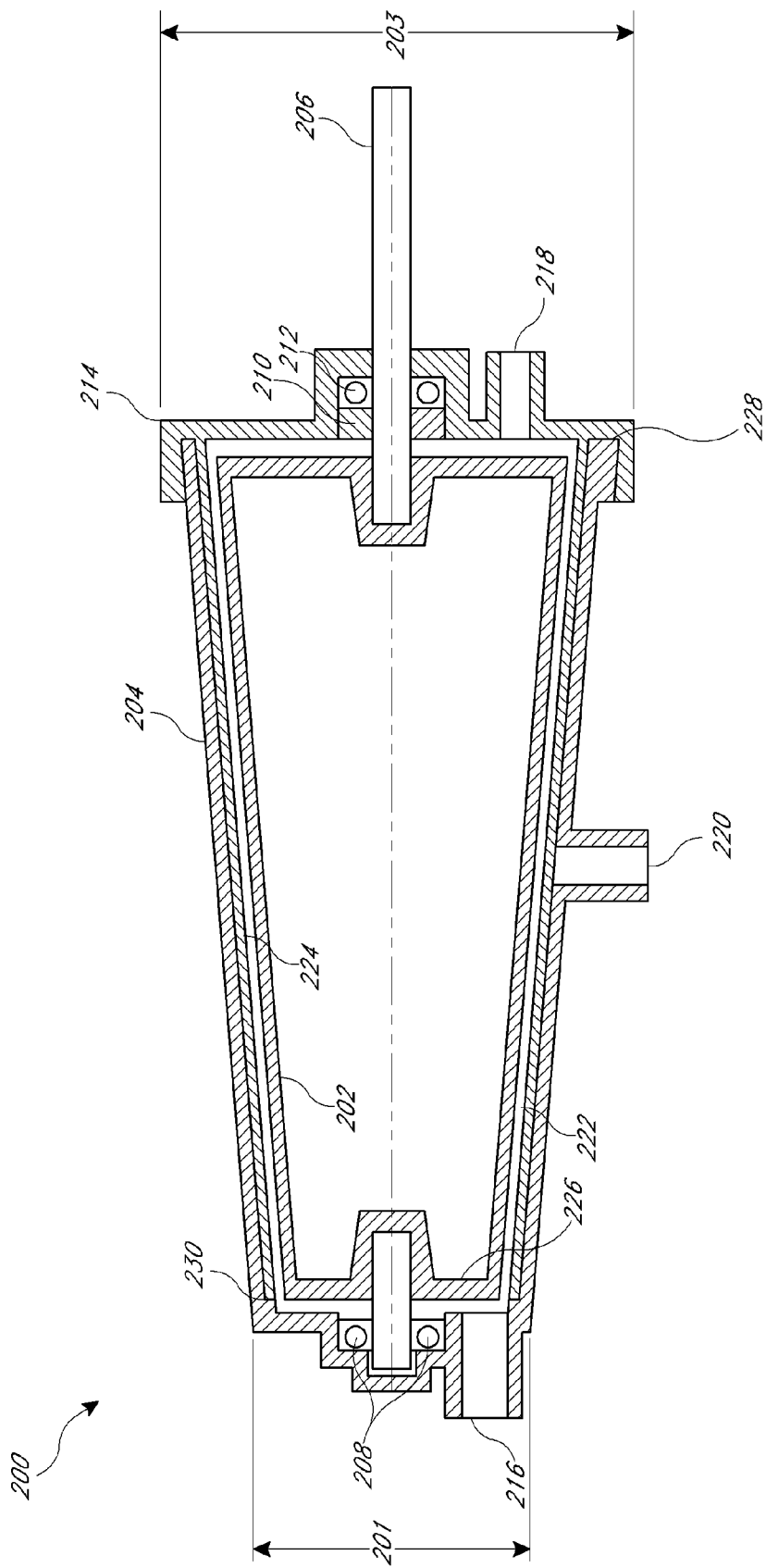
FIG. 2 illustrates an inner view of an embodiment of the housing containing the rotor and filter.

FIG. 2 illustrates an embodiment of a filtration device 200 using T-V technology. In some embodiments, the shape of the rotor 202 and the housing 204 can be a conical configuration. In such configurations, the filtration device can be manufactured for ease of installation of the filtration device, further described below. In one embodiment, the housing 204 can be approximately 6 inches long with an inside diameter 201 of approximately 1.5 inches at one end, and an inside diameter 203 of approximately 2.5 inches at the opposite end. In other embodiments, the housing 204 can be other desired lengths such as, for example, approximately 12 inches, 1 foot, 5 feet, etc. In some embodiments, the diameters of the housing 204 can be approximately 0.5 inches, 5 inches, 10 inches, 1 foot, 2 feet, etc. The size of the housing 204 is not limiting. The rotor can be supported axially on either end by a drive axle 206. On the end with the smaller diameter 201 of the housing 204, the drive axle 206 can be supported by a conventional roller bearing 208 fixed to the housing 204. On the end with the larger diameter 203 of the housing 204, the drive axle 206 can be supported by a seal 210 and roller bearing 212 fixed in a housing cap 214. The seal 210 can prevent fluid from leaking around the axle 206. The axle 206 can extend through the housing cap 214 and can connect to a motor used to spin the rotor 202 inside the housing 204. The housing 204 and housing cap 214 can contain multiple fluid ports, as shown in FIG. 2, although the number of fluid ports is not limiting. An inlet port 216 on the smaller diameter end 201 can be located for the waste gray water to enter the filtration device 200. A retentate output port 218 on the larger diameter end 203 can be located where a small percentage, for example approximately 5%, of concentrated retentate can be output from the device 200. A filtered gray water output port 220 can be located between the smaller diameter end 201 and the larger diameter end 203 and configured so the filtered gray water can be output from the device 200.

The taper angle of the rotor 202 and the inside of the housing 204 can be equal. In the embodiment of FIG. 2, the taper angle is approximately 4.76 degrees. In other embodiments, the taper angle can be approximately 3 degrees, 4 degrees, 5 degrees, 6 degrees, 7 degrees, etc. The taper angle is not limiting. In some embodiments, the taper angle can change. With the 4.76 degree taper angle, the gap 222 between the rotor 202 and a filter assembly 224 can be approximately 0.050 inches. In other embodiments, the gap 222 can be approximately 0.010 inches, 0.1 inches, 0.2 inches, 1 inch, etc. The size of the gap 222 is not limiting. In some embodiments, the size of the gap 222 can change. The filter assembly 224 can comprise a filter and a substrate, as described below. However, other angles and gap distances can be used and are not limiting. Because the diameter of the filtration device 200 changes at any point along the axis of the rotor 202, the shear rate and Taylor number change as well. In some embodiments, there may be advantages in having the shear rate increase and the Taylor number decrease as the gray water travels from the inlet port 216 to the output port 220, or vice versa. In other embodiments, there may be reason to adjust the gap 222 as the diameter changes so that the ratio of the shear rate to the Taylor number remains relatively constant. Retaining a constant Taylor number can be done by making the taper angle of the rotor 202 different from the taper angle of the housing 204.

An advantage of the conical shape of both rotor 202 and housing 204 is that the gap 222 can be changed simply by moving the rotor 202 relative to the housing 204. This could be accomplished by re-positioning the drive axle 206, towards the smaller diameter end 201 or the larger diameter end 203. In some embodiments, the fluid can travel from the inlet port 216 to the outlet ports 218/220, wherein the radius of the housing 204 and rotor 202 increases during the travel. If the gap 222 is kept constant, increasing the radius can increase the vorticity but decrease the shear rate.

The rotor 202 can be configured such that it produces pressure differentials resulting in the flow of fluid from input to output ends of the housing 204. The nature of the tapered rotor 202 can cause some pressure differential between the input 216 and output ports 218/220. Greatly increased pressure differentials can be made with a device called an "impeller". An impeller can comprise a rotating element inside a chamber to increase flow of a fluid. The impeller is attached to the rotor and thus is driven to rotate with the rotor by the motor. FIG. 2 shows an example location where an impeller 226 could be located in some embodiments. In embodiments using an impeller 226, an approximately 248 ml/min flow at approximately 2650 rpm can be created. In other embodiments, the impeller 226 can create approximately a 100 ml/min flow, a 200 ml/min flow, a 300 ml/min flow, etc. In other embodiments, the impeller can be run at approximately 1000 rpm, 2000 rpm, 3000 rpm, etc. The flow and the rpm of the impeller are not limiting. In some embodiments an impeller can be rotated at 1800, 2650, 2750, or 3200 rpm to achieve a filtrate flow rate of 106, 142, 156, and 190 ml/min respectively, and a retentate flow rate of 42, 82, 94, and 128 ml/min respectively.

As shown in FIG. 2, the housing can be made in two sections. One section, referred to as the housing cap 214, can include the seal 210 and bearing 212 for the larger diameter end of the rotor 202. The second section of the housing can comprise the rest of the housing 204. The housing cap 214 can be screwed in place to the housing 204. An O-ring seal 228 can provide a fluid tight junction between the cap 214 and the housing 204.

The embodiment shown in FIG. 2 can provide a convenient way to change the filter assembly 224, or filtration media/substrate assembly. In some embodiments, the cap 214 can be unscrewed and removed. The filtration media/substrate assembly 224 can then be removed from the housing 204. In some embodiments, the cap 214 can be unscrewed and the housing 204 can be removed, wherein the filtration media/substrate assembly 224 can be removed from the housing 204. Once the used filtration media/substrate assembly 224 is removed, a replacement assembly can be pushed into the housing 204 and snapped in place. Circumferential seals can engage with the circumferential grooves 230 in the housing 204. Then the housing 204 can be screwed back onto the cap 214, or the cap 214 can be screwed back onto the housing 204, thus allowing the system to be started up again. In some embodiments, the controller 134 (illustrated in FIG. 1) can use readings from pumps 126, and 128, and sensor 122 to determine when the filtration assembly 224 should be changed, and the controller 134 can be configured to alert a user with an audible or visual alarm. As described above, filtration media/substrate assembly 224 can be removed from the housing 204, replaced, and disposed.

In some embodiments, the filtration assembly 224 can be placed on the inside wall of the stationary housing 204 surrounding the rotor 202. Advantageously, rotary seals can be eliminated. In this embodiment, the filter assembly 224 can be held stationary, and the exit path for the filtrate is a stationary port in the case which is located downstream from the filter assembly 224.

Figure 3:
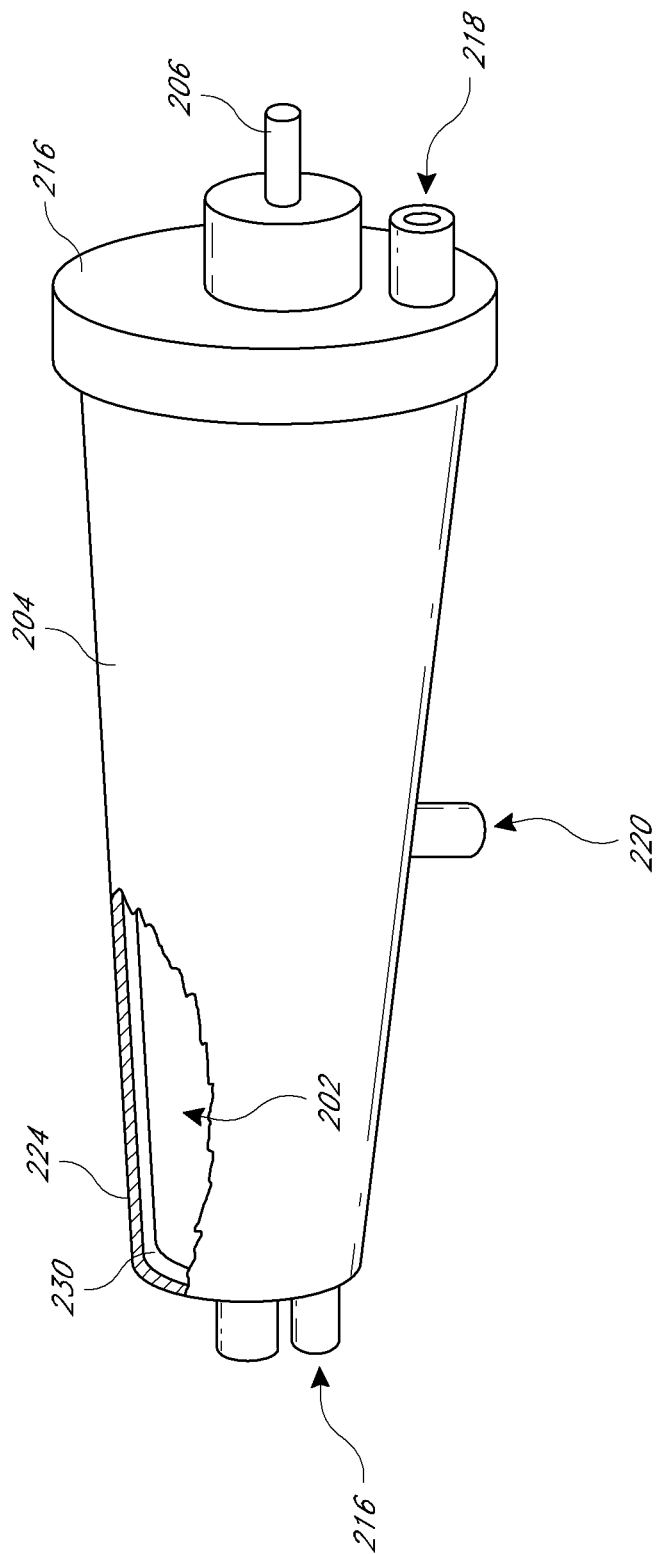
FIG. 3 illustrates an outer view of an embodiment of the housing containing the rotor and filter.

FIG. 3 illustrates an outer viewpoint of the T-V filtration device 200, showing the location of the ports 216, 218, and 220. FIG. 3 further illustrates a cutout portion of the housing 204, for viewing of the rotor 202.

Figure 4A:
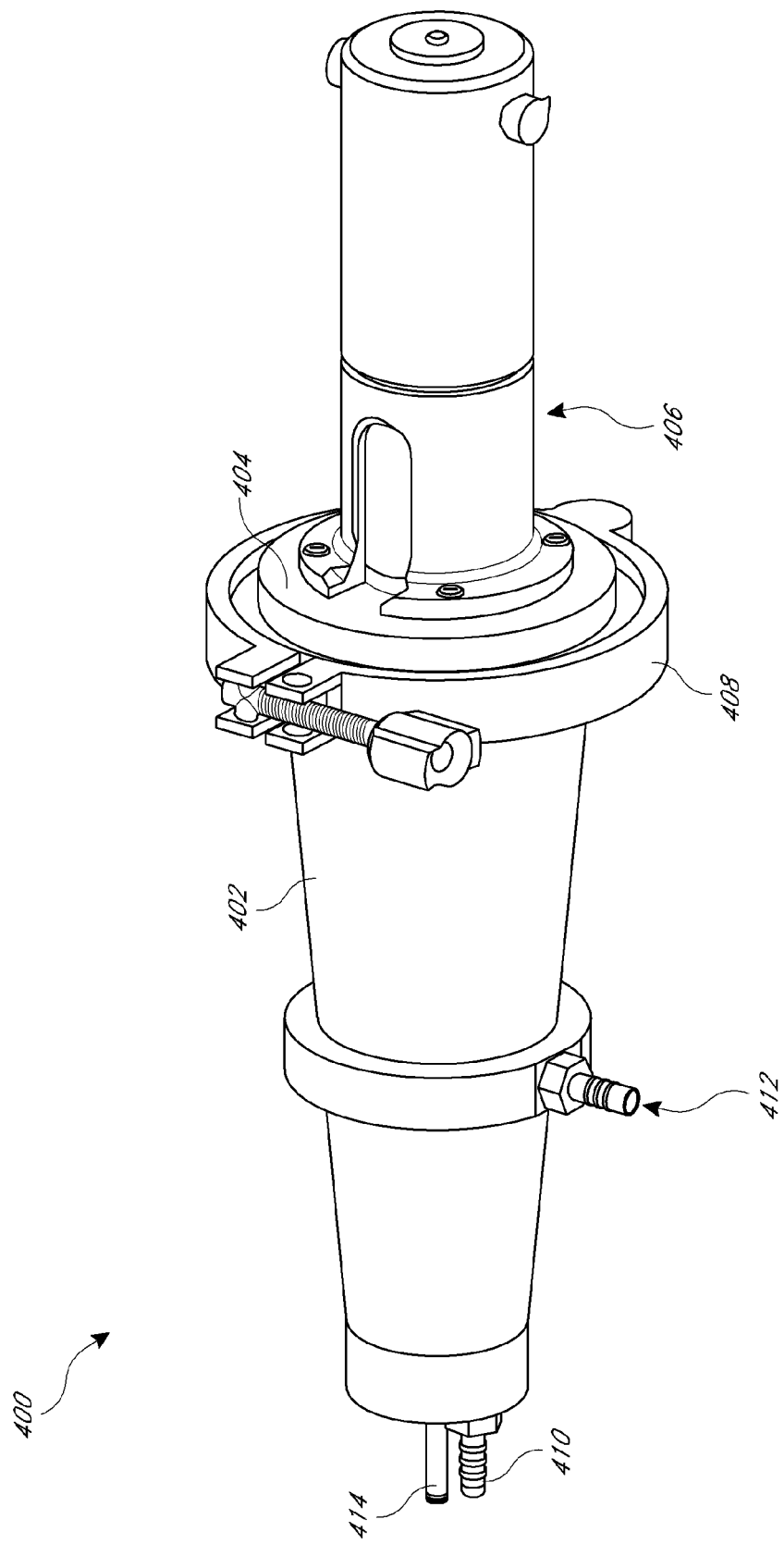
FIGS. 4A and B illustrate outer and inner viewpoints of an embodiment of the filtration device.

FIG. 4A illustrates an outside perspective of an embodiment of a T-V filtration device 400. The device 400 can have an outer housing 402 that surrounds an internal filtration system. As shown, the housing 402 can be generally conical in shape. The housing 402 can be capped at one end by an end cap 404. In some embodiments, the end cap 404 can be attached to a motor mount 406. The end cap 404 can be attached to the motor mount 406 through the use of, for example, screws or welding, though the attachment means is not limiting. In some embodiments, the housing 402 can be surrounded by an attachment ring 408. The attachment ring 408 can be tightened and loosened so that the end cap 404 can be removed and attached for changing of the filtration system inside the housing 402. Further, the housing 402 can have a plurality of input/output ports 410/412. The housing 402 can also be configured to support a drive axle 420.

Figure 4B:
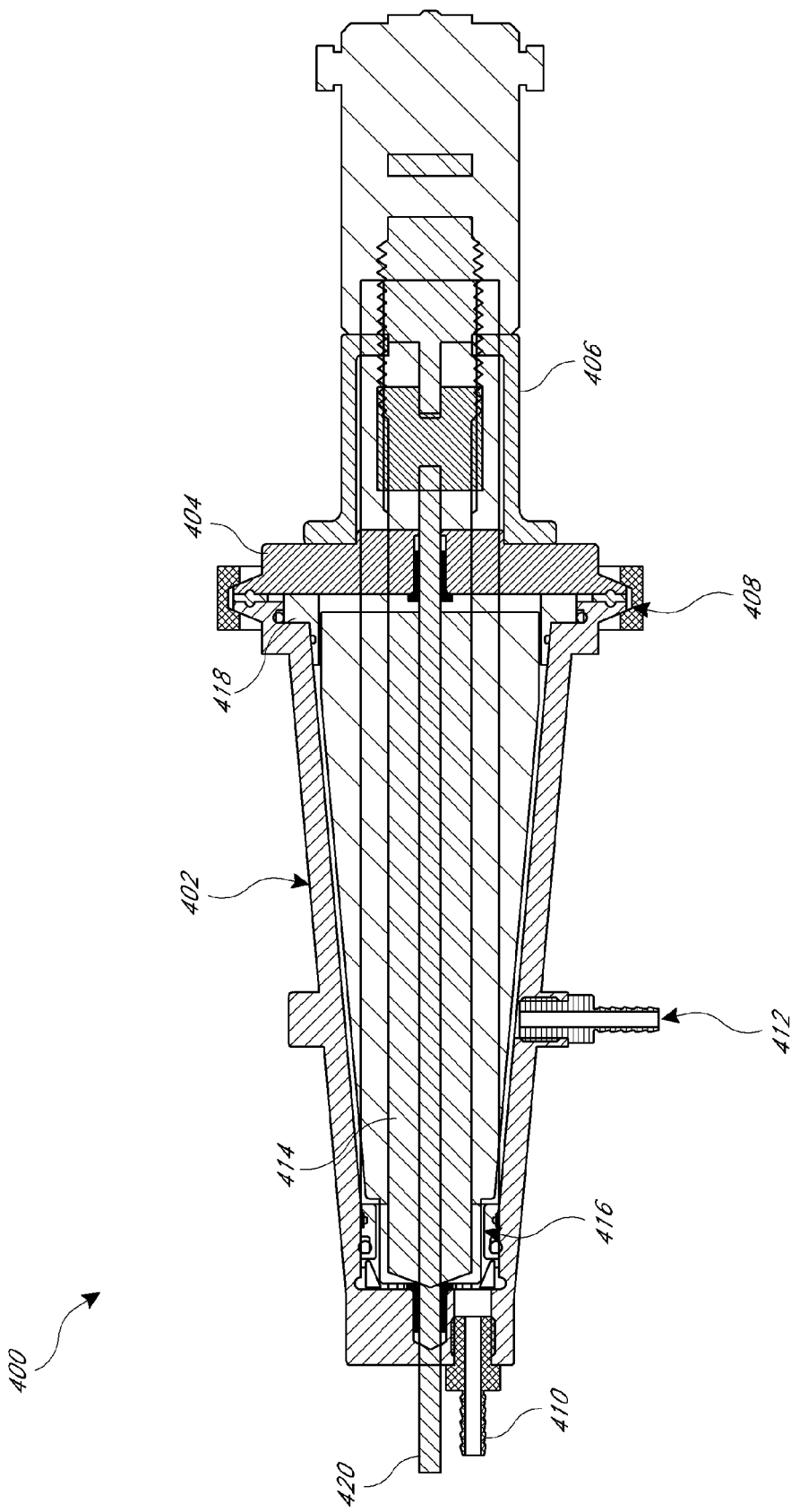

FIG. 4B illustrates a cut-out perspective of the T-V filtration device 400. As shown, inside the housing 402 described with respect to FIG. 4A is a rotor 414, described with respect to FIGS. 9A-F. There can be a gap between the rotor 414 and the housing 402. The pair of retainer rings 416/418 is described with respect to FIGS. 7A-C and 8A-B, respectively. Further, the housing 402 can be closed with an end cap 404, described with respect to FIGS. 6A-C. Further, the device 400 can have a motor mount to attach a motor to the end cap 404, described with respect to FIGS. 10A-F.

Figure 5C:
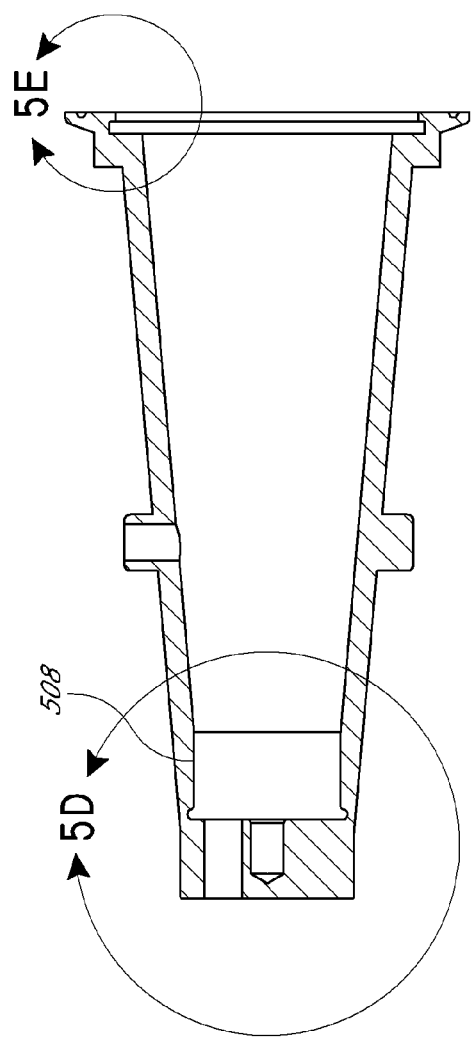
Figure 5E:
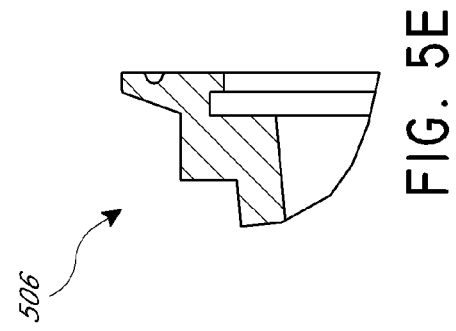
Figure 5D:
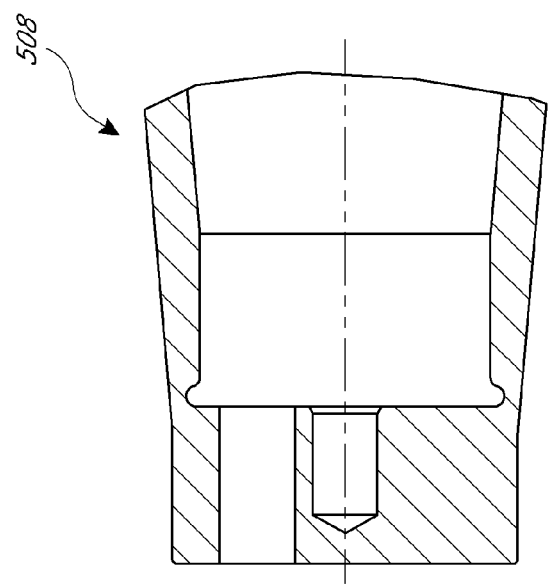

FIGS. 5A-E illustrate an embodiment of housing 402 of FIG. 4. FIG. 5A illustrates a barrel viewpoint of the housing 402. As shown, in some embodiments the housing 402 can contain at least one ring 502. Ring 502 is one example for providing strength to the housing 402 to support the filtrate outlet port 412 and other support means can be used. FIG. 5B illustrates a side view of the outside of the housing 402. The housing 402 can be generally conical, and sized to contain the rotor 414 and any filtration media. The housing 402 can also have an attachment feature 506 that can be used to secure the end cap 404 onto the housing 402, as further described below. FIG. 5E illustrates a close up of the attachment piece 506. In some embodiments, the housing 402 can be manufactured with an open front end, and a front portion 508, shown in FIG. 5D, containing the input port 410 and the drive axle 420. As shown in FIG. 5C, the front portion 508 could be integrated into the housing 402 so that they are one piece. The housing 402 can be manufacture with, for example, stainless steel or aluminum, however the material is not limiting.

Figure 6C:
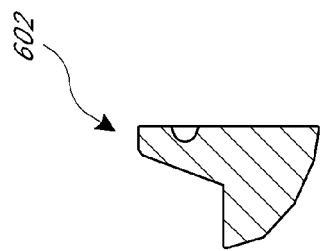
FIGS. 6A-C illustrate different viewpoints of an embodiment of a cap.
Figure 6B:
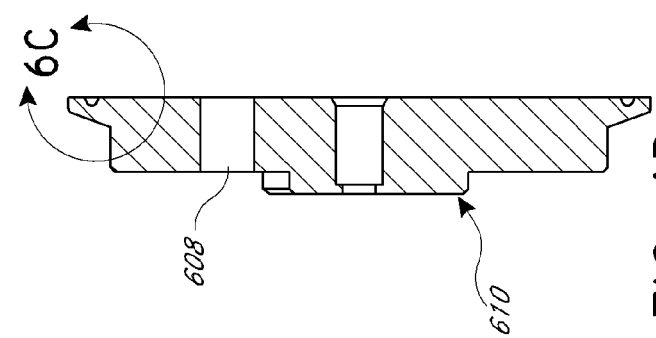
Figure 6A:
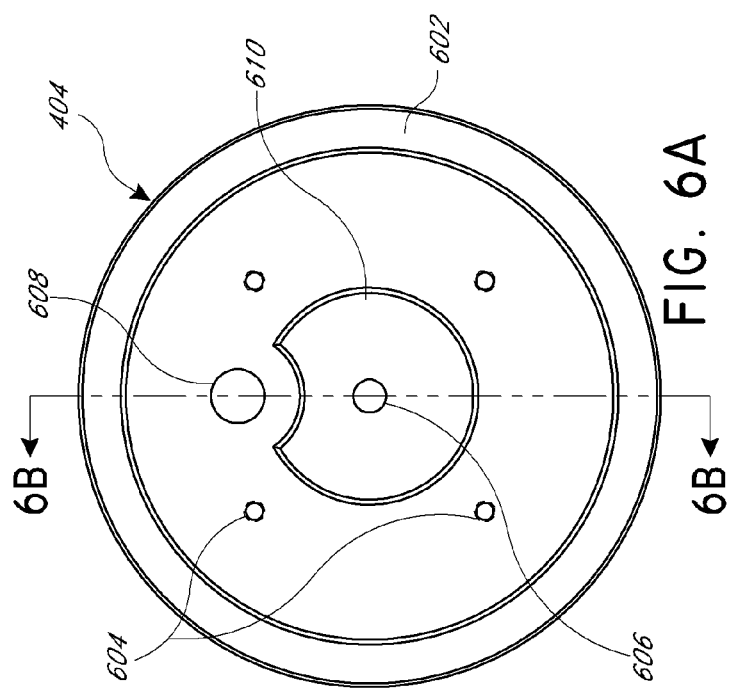

FIGS. 6A-C illustrate different perspectives of an embodiment of the end cap 404 of FIG. 4. The end cap 404 can be sized and configured to fit within the housing 402 of the filtration device 400. In some embodiments, the end cap 404 can be screwed directly into the housing 402. In some embodiments, an attachment ring 406 can be used to hold the cap in place. In some embodiments, the end cap 404 can have an outer edge 602 along the circumference of the end cap 404. The outer edge 602 can be configured to be inserted into a slot in the housing 402 so that the end cap 404 can be retained within the housing 402. In some embodiments, the outer edge 602 extends partially around the circumference of the end cap 404, or, in other embodiments, multiple outer edges 602 can be used. As shown in FIG. 6A, the end cap 404 can contain at least one screw hole 604, which can allow for attachment of a motor mount 406. Additionally, the end cap 404 can contain a drive-axle hole 606 configured to receive a drive axle 420 Further, the end cap 404 can have a retentate output port 608. In some embodiments, the end cap 404 can have a raised portion 610 to fit a motor. The end cap 404 can be made from, for example, stainless steel or aluminum, although the material is not limiting.

Figure 7C:
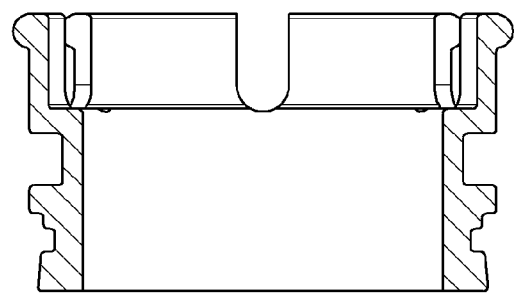
FIGS. 7A-C illustrate different viewpoints of an embodiment of a small retention ring.
Figure 7B:
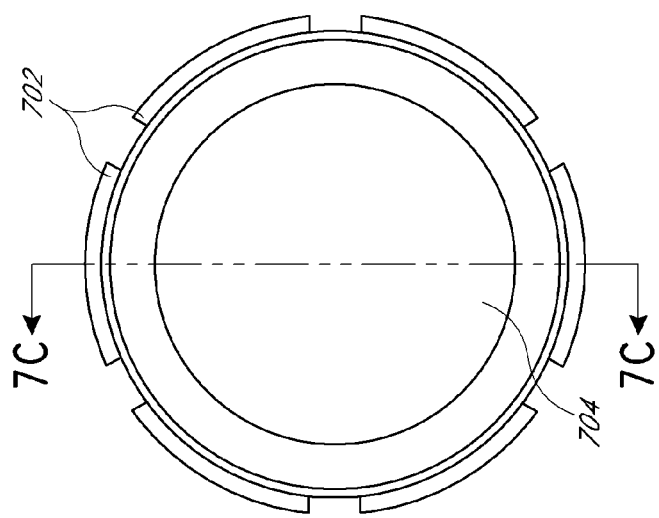
Figure 7A:
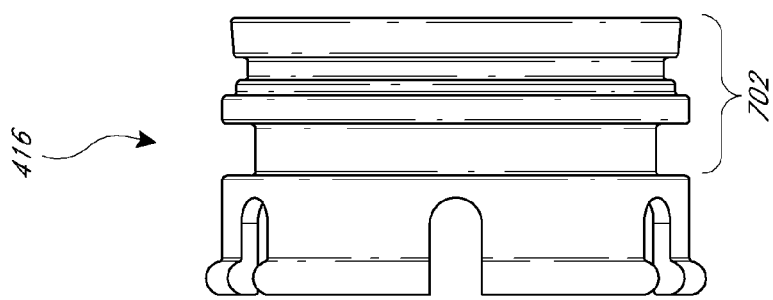

FIGS. 7A-C show an embodiment of a small retainer ring 416 of FIG. 4. The small retainer ring 416 can be configured to surround the smaller portion of the conical shaped rotor 414. The retainer ring 416 has ridges 702 that fit within grooves formed in the housing 402 so that the ring 416 locks in place within the housing. The ring 416 can be formed from, for example, plastic or metal. In some embodiments, the small retainer ring 416 can be made of, for example, GE Plastics' ULTEM® 1000, although the material is not limiting.

Figure 8B:
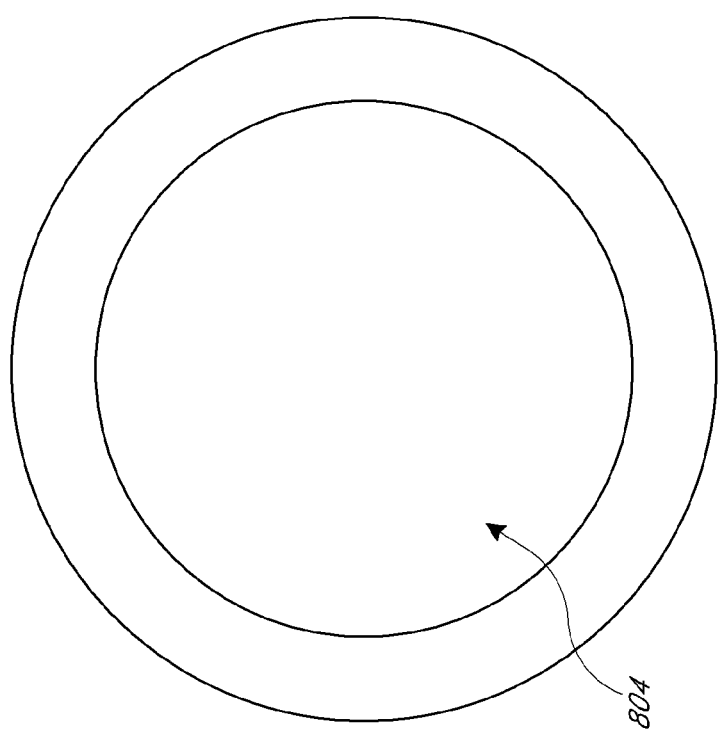
FIGS. 8A and B illustrate different viewpoints of an embodiment of a large retention ring.
Figure 8A:
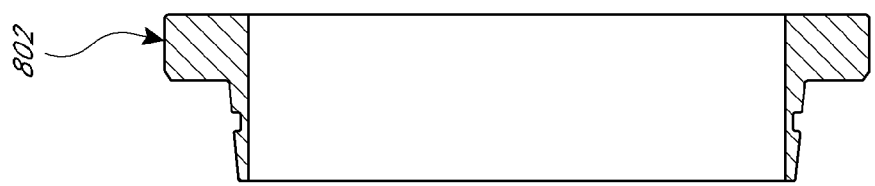

FIGS. 8A and 8B show an embodiment of a large retainer ring 418 of FIG. 4. The retainer ring 418 can be configured to surround the larger portion of the conical shaped rotor 414. The retainer ring 418 can have a fitted edge 802 that can fit within a recess formed in the housing 402. The ring 418 can be formed from, for example, plastic or metal. In some embodiments, the large retainer ring 418 can be made of, for example, GE Plastics' ULTEM® 1000, although the material is not limiting.

Rings 416/418 are configured to give support the filter 1150 and the substrate 1152, described in detail below. Rings 416/418 can contain O-rings, such as those shown as 1154 in FIG. 11. The rings 416/418 can be located within the housing 402 and can remain stationary. In some embodiments, a filter and/or substrate, as further described below, can be attached to the retainer rings 416/418. In some embodiments, retainer rings may not be used at all, and the rotor 414 can be configured to fit directly into the housing 402.

Figure 9C:
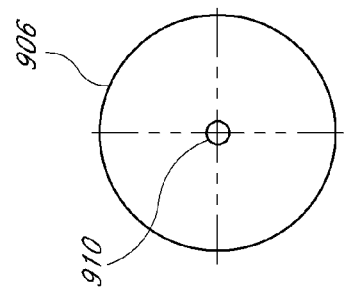
Figure 9B:
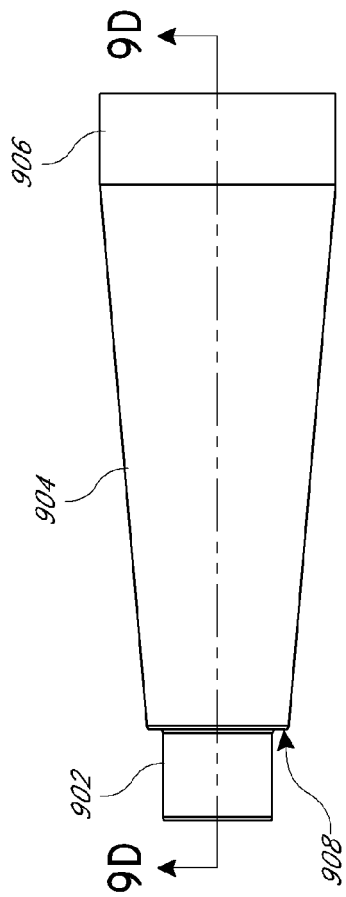
Figure 9A:
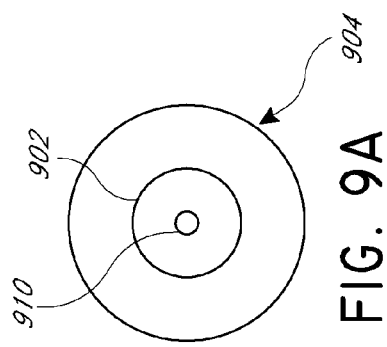
Figure 10D:
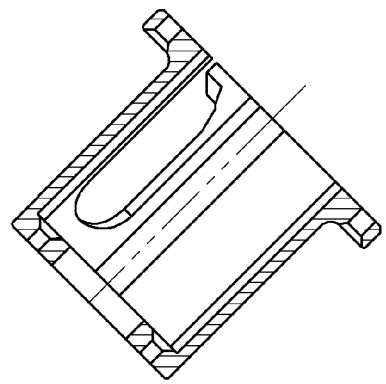
FIGS. 10A-F illustrate different viewpoints of an embodiment of a motor mount.
Figure 10A:
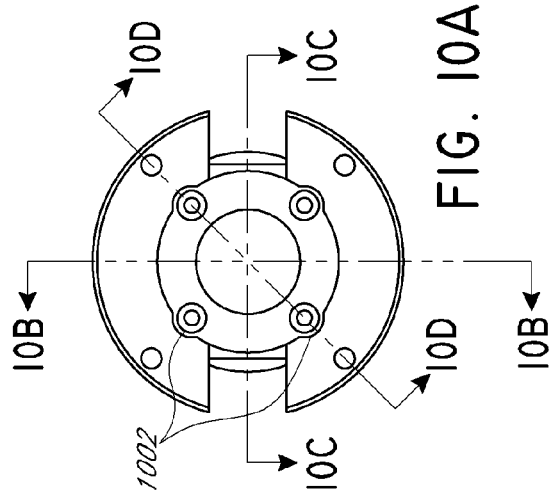
Figure 10C:
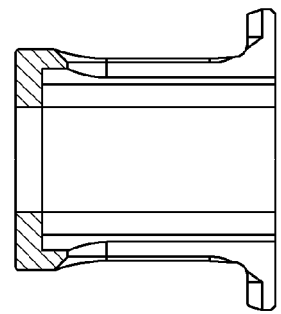
Figure 10B:
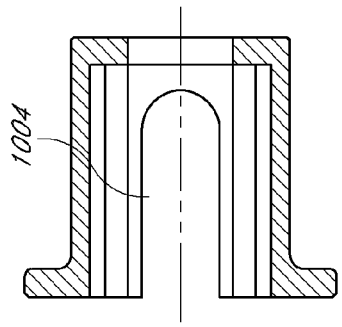
Figure 10F:
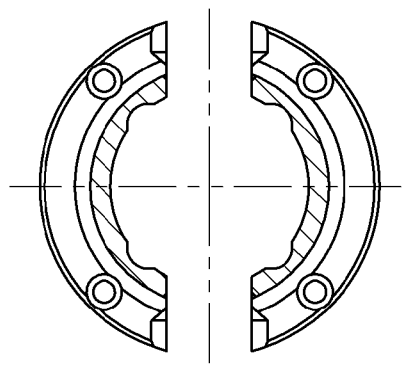
Figure 10E:
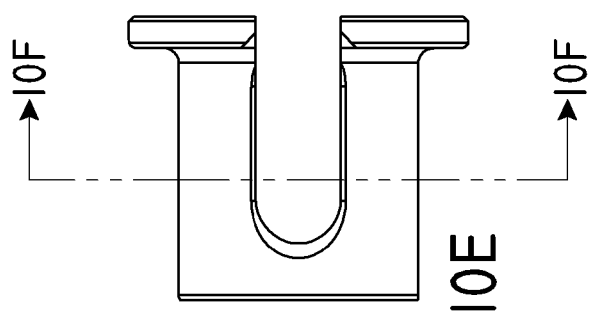

FIGS. 9A-F illustrate an embodiment of rotor, such as rotor 414 or 202, although all non-limiting references will be made with respect to rotor 414. The rotor 414 can be conical in shape and sized to fit within the housing 402. In some embodiments, the rotor 414 can comprise a narrowed portion 902 at one end of the rotor, a conical portion 904 in the middle, and a cylindrical portion 906 at the opposite end of the narrowed portion 902. In some embodiments, the narrowed portion 902 can be generally cylindrical, instead of conical, and configured to fit within the small retainer ring 416. The narrowed portion 902 can have a smaller diameter than the conical portion 904, creating a step-down feature 908 as shown in FIG. 9E. On the other end of the rotor 414, the conical portion 904 could form into the cylindrical portion 906. Like the narrowed portion 902, the cylindrical portion 906 can contain a similar step-up feature, or can be smoothly integrated with the conical portion 904. The cylindrical portion 906 can have a generally cylindrical shape, and can be configured to fit within the large retainer ring 418. The rotor 416 can further have a drive axle hole 910 through the center of the rotor for a drive axle to pass through. In some embodiments, the rotor 414 can be made of, for example, DuPont™ DELRIN® or aluminum, though the material is not limiting.

FIGS. 10A-F show different viewpoints of an embodiment of motor mount 406 of FIG. 4. The motor mount 406 can be used to attach the filtration device 200 to a motor. As previously described, the motor mount 406 can be attached to the end cap 404. Screw holes 1002 can be drilled into the mount 406 so that the mount 406 and end cap 404 can be attached to one another. In some embodiments, the mount 406 can have a generally U-shaped hole 1004 cut out of opposite sides of the mount 406. In some embodiments, motor mount 406 can be manufactured as a single piece. In some embodiments, motor mount 406 can be two halves attached together through, for example, screwing or welding. The motor mount 406 can be manufactured with, for example, stainless steel or aluminum, however the material is not limiting.

Figure 11:
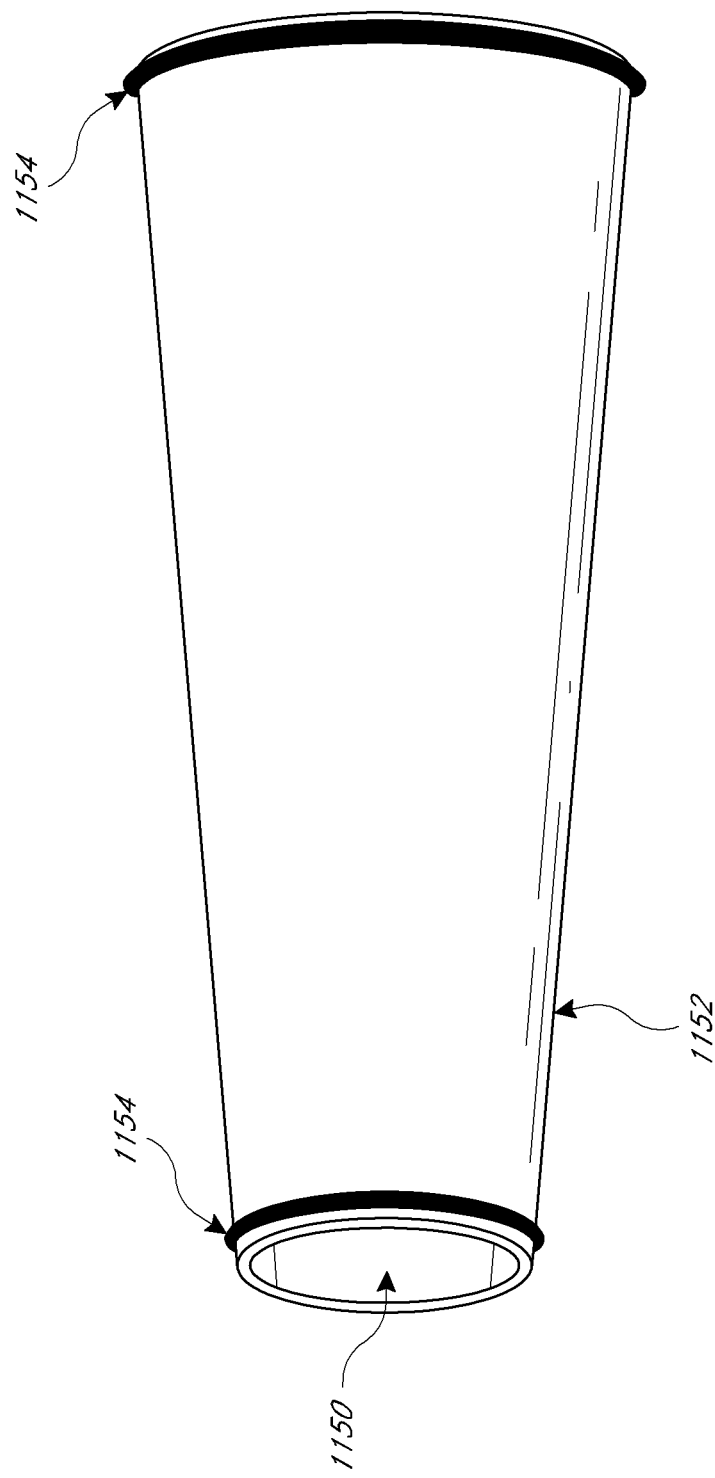
FIG. 11 illustrates an embodiment of the filter with a conical shape.

FIG. 11 illustrates the filter/filtration media assembly 224 fabricated in the approximate shape of a cone. Filter media 1150 can be located on the inside surface of the cone while a substrate 1152 can be located on the outside surface of the cone. A substrate 1152 can be used when the filter 1150 is not rigid enough to maintain a set shape, such as a cone of fixed dimensions. In some embodiments, the filter media 1150 and the substrate 1152 are fixed together. In addition, media can rest on the substrate surface 1152 that allows flow of the filtrate with minimal resistance to an exit port. In some embodiments, Genesee Scientific 57-106 NITEX® Nylon (50 micron mesh) can be used as the filter 1150 and Genesee Scientific 57-101 NITEX® Nylon (630 micron mesh) can be used as the substrate surface 1152. In such embodiments, the 630 micron mesh, which can act as the substrate 1152, has enough rigidity to maintain the conical shape, and it acts as a protective outer layer for the inner layer of 50 micron mesh filter, which can act as the filter 1150. However, other filters and substrates can be used and the material is not limiting. In some embodiments, ends of the filtration media cone can be made with circumferential seals 1154 that can slip into shallow circumferential ridges 230 in the housing 204 (illustrated in FIG. 2). These seals 1154 can isolate the filtered gray water on the outside surface of the filter assembly 224 (illustrated in FIG. 2) with the unfiltered gray water in the inside surface, facing the rotor 202. In some embodiments, the circumferential seals 1154 can be given increased physical integrity if stainless steel wires are embedded into them. The stainless steel wires can also aid the leak proof connection between the filter 1150 and retainer rings 216/218. In some embodiments, the seals 1154 can be attached to the retainer rings 416/418 (illustrated in FIGS. 6 and 7). In some embodiments, the filter 1150 can be attached to a rotor.

The filter 1150 and substrate 1152 can be attached to the rings 216/218, and these four components can make up the insertable/removable filter/filtration media assembly 224. In some embodiments, the circumferential seals 1154 can produce a fluid tight seal against the housing 402 so that filtrate does not escape into the gap and so that retentate or input fluid does not enter the filtrate.

Figure 12:
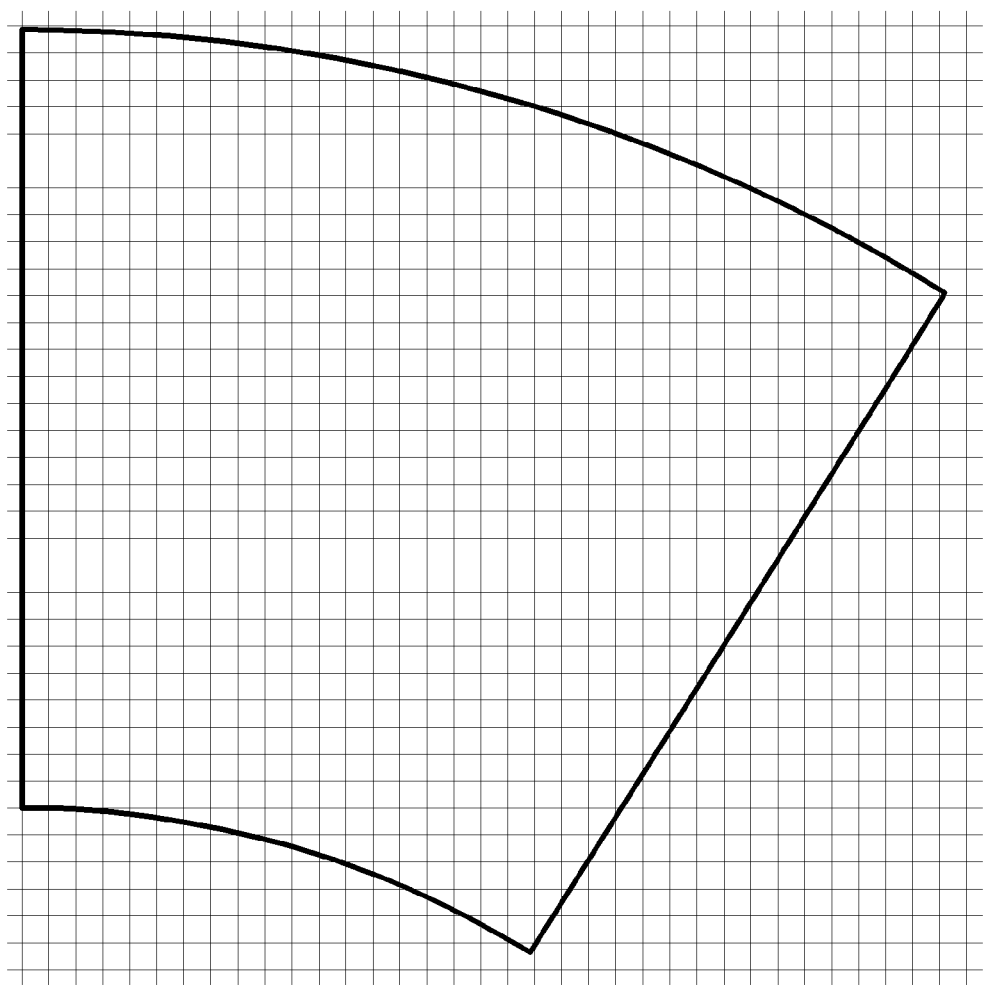
FIG. 12 illustrates a spread out schematic of a portion of the conical filter.

FIG. 12 illustrates an embodiment of the filtration media 1150 in an unwrapped position. In some embodiments, the filtration media 1150 can be approximately 1, 2, 3, 4, 5, 6, 7, 8, 9, 10, 11, 12, 13, 14, or 15 inches in length, preferably about 7.25 inches in length, as defined by the distance between the media 1150 at the front of the housing 204 and the back of the housing 204. The filtration media 1150 can have a curvature of about 0.5, 1, 1.5, 2, 2.5, 3, 3.5, or 4 inches. The filtration media 1150 can be approximately 0.001 to 0.1 inches thick, for example about 0.005, 0.01, or 0.05 inches thick. However, other dimensions can be used. For example, a much larger filtration media 350 can be used to collect a large amount of gray water from an apartment complex as compared to an individual house. In one embodiment, the filtration media 1150 can be approximately 6 inches long with a diameter of approximately 1.5 inches at one end, and a diameter of approximately 2.5 inches at the opposite end. In other embodiments, the filtration media 1150 can be other desired lengths such as, for example, approximately 12 inches, 1 foot, 5 feet, etc. In some embodiments, the diameters of filtration media 1150 can be approximately 0.5 inches, 5 inches, 10 inches, 1 foot, 2 feet, etc. The filtration media 1150 can be sized to fit in the housing 402.

In some embodiments, the rotor and housing may not be a cone shape. The rotor and housing may be shaped to produce a gap between the rotor and housing, or filter, that varies in a non-linear fashion along the axis from inlet to outlet port, and the shape is not limiting.

EXAMPLES

The following examples are provided to demonstrate the benefits of embodiments of a filtration system as described above. These examples are discussed for illustrative purposes and should not be construed to limit the scope of the disclosed embodiments.

Example 1

A filtration media of 40 micron POREX® media's was used in an embodiment of the filtration device.

The 40 micron filtration media had ample strength, and therefore a substrate layer was not used. The filtration device was operated with an inlet flow of about 100 ml/min, and the rotor was spun at about 2600 rpm. A solution of 90 g sunscreen, 60 g skin moisturizer, 195 g toothpaste, 60 g deodorant, 300 g clay, 42 g vegetable oil, 432 g shampoo, and 900 g laundry detergent was prepared for filtering (hereinafter "Gray Water Test Solution"). About 4 liters of Gray Water Test Solution was inputted into the filtration device. The filtrate flow was set to about 90 ml/min and trans-membrane pressure ("TMP") was stable from about −2 to 13 mm Hg.

In some embodiments, different filtration media can be used. For example, nylon, polyester, cellulose acetate, polycarbonate, polypropylene, polytetrafluorethylene (PTFE), regenerated cellulose, or polyethersulphone (PES) could be used. Filtration media from, for example, STERLITECH or MILLIPORE can be used. In some embodiments, media that absorbs certain contaminants can be used. For example, Pall Corporation ULTRABIND™ could be used to bind proteins. Further, a positively or negatively charged membrane could be used to bind the opposite charge molecule. In any embodiment, the contaminants could be washed out. For example, a chemical wash or an acid/base wash could be used.

Example 2

A filtration media of 50 micron nylon fiber (GENESEE 57-106 nylon mesh) was used in an embodiment of the filtration device. A substrate of 630 micron mesh (GENESSE 57-101) was used as a substrate where the filter media was surrounded by the substrate. Approximately 4 gallons of Gray Water Test Solution was used. The motor was set to spin the rotor at approximately 1800 rpm Approximately 1200 ml/min of Gray Water Test Solution was inputted into the filtration device. Flow from the retentate port was set at about 100 ml/min with a pump. In some embodiments, a peristaltic pump can be used. The trans-membrane pressure measured varied from about 65 to about 93 mm Hg. Approximately 14 gallons were processed in about 49 minutes. There was no perceived rise in trans-membrane pressure, showing that the filter media was not being clogged by components of the Gray Water Test Solution.

Further Examples

Further testing was also performed on the filtration device. For example, 4 oz of Bentonite Clay was added to the Gray Water Test Solution with similar positive results, where the clay was removed during filtration. Further, 50 g OPS Diagnostics' 100 micron silica beads in 6 L of water was added to the Gray Water Test Solution, with the results showing that the filtration device was secure, as no beads were found in the filtrate.

The filter media described above was also replaced with 20 micron INDUSTRIAL NETTING WS0020 media and the rotor was rotated at a speed of about 200 rpm. The filtration device was trans-membrane pressure stable between about 123 and 95 mm Hg during about 112 minutes of running with the Gray Water Test Solution.

Taylor Number and Shear Rate

Table I below illustrates calculations for both the Taylor number and shear rate for an embodiment of a filtration device as described above. All units are in inches unless otherwise defined.

TABLE I

| Housing Inner Diameter | Housing Circum. | Housing Length | Gap | Revolutions per minute (revs/min) | Revolutions per second (revs/sec) | Velocity at rotor (mm/sec) | Taylor Number | Shear Rate (1/sec) |
|---|---|---|---|---|---|---|---|---|
| 1.58 | 4.96372 | 7.22 | 0.001 | 2000 | 33.3 | 4200 | 4 | 165373 |
| 1.58 | 4.96372 | 7.22 | 0.005 | 2000 | 33.3 | 4200 | 42 | 33075 |
| 1.58 | 4.96372 | 7.22 | 0.01 | 2000 | 33.3 | 4200 | 120 | 16537 |

TABLE I-continued

| Housing Inner Diameter | Housing Circum. | Housing Length | Gap | Revolutions per minute (revs/min) | Revolutions per second (revs/sec) | Velocity at rotor (mm/sec) | Taylor Number | Shear Rate (1/sec) |
|---|---|---|---|---|---|---|---|---|
| 1.58 | 4.96372 | 7.22 | 0.015 | 2000 | 33.3 | 4200 | 221 | 11025 |
| 1.58 | 4.96372 | 7.22 | 0.02 | 2000 | 33.3 | 4200 | 340 | 8269 |
| 1.58 | 4.96372 | 7.22 | 0.024 | 2000 | 33.3 | 4200 | 446 | 6891 |
| 1.58 | 4.96372 | 7.22 | 0.03 | 2000 | 33.3 | 4200 | 624 | 5512 |
| 1.58 | 4.96372 | 7.22 | 0.0305 | 2000 | 33.3 | 4200 | 639 | 5422 |
| 1.58 | 4.96372 | 7.22 | 0.035 | 2000 | 33.3 | 4200 | 786 | 4725 |
| 1.58 | 4.96372 | 7.22 | 0.04 | 2000 | 33.3 | 4200 | 960 | 4134 |
| 1.58 | 4.96372 | 7.22 | 0.045 | 2000 | 33.3 | 4200 | 1146 | 3675 |
| 2.87 | 8.82788 | 7.22 | 0.001 | 2000 | 33.3 | 7630 | 5 | 300393 |
| 2.87 | 8.82788 | 7.22 | 0.005 | 2000 | 33.3 | 7630 | 57 | 60079 |
| 2.87 | 8.82788 | 7.22 | 0.01 | 2000 | 33.3 | 7630 | 162 | 30039 |
| 2.87 | 8.82788 | 7.22 | 0.015 | 2000 | 33.3 | 7630 | 297 | 20026 |
| 2.87 | 8.82788 | 7.22 | 0.02 | 2000 | 33.3 | 7630 | 458 | 15020 |
| 2.87 | 8.82788 | 7.22 | 0.024 | 2000 | 33.3 | 7630 | 602 | 12516 |
| 2.87 | 8.82788 | 7.22 | 0.025 | 2001 | 33.4 | 7630 | 640 | 12016 |
| 2.87 | 8.82788 | 7.22 | 0.03 | 2000 | 33.3 | 7630 | 841 | 10013 |
| 2.87 | 8.82788 | 7.22 | 0.035 | 2000 | 33.3 | 7630 | 1059 | 8583 |
| 2.87 | 8.82788 | 7.22 | 0.04 | 2000 | 33.3 | 7630 | 1294 | 7510 |
| 2.87 | 8.82788 | 7.22 | 0.045 | 2000 | 33.3 | 7630 | 1544 | 6675 |

For reference, a device used for filtering blood, such as a PLASMACELL device operating at optical conditions has a Taylor number of about 639 and a shear rate of about 7850 l/sec. The diameter of the rotor and case of the blood filtering device is generally cylindrical. However, the diameter of the rotor and case of embodiments of the device described above is not constant, but varies between the inlet (inner diameter equals about 1.58 in) and the outlet (about 2.87 in). When the rotor spins at about 2000 RPM, a gap of about 0.0305 inches can provide a Taylor number equal to the PLASMACELL device. At the outlet, a gap of about 0.025 inches can provide a Taylor number of about 640, close to the Taylor number for the PLASMACELL device of about 639. Thus, to reproduce the PLASMACELL device, the gap could change from about 0.0305 inches at the inlet to about 0.025 inches at the outlet. Additionally, the shear rate for the PLASMACELL is about 7850 l/sec. At the inlet above, it is about 5422 l/sec. and at the outlet about 12022 l/sec.

A shear rate of about 12022 l/sec. may destroy blood cells in blood filtration, but this may be complementary to increased filtration when processing gray water. The gap and shape of the rotor can be adjusted to benefit higher filtration rates. For example, it may be beneficial to have a higher shear rate and or Taylor number at the output of the housing, as the retentate concentration is higher there (as filtrate has been removed starting at the inlet). Higher retentate concentration means a higher tendency to occlude the filter with a concentration polarization layer of retentate. Higher shear rate and or a higher Taylor number may reduce filter clogging by reducing this concentration polarization.

Another feature of the filtration device described above is that a slight shift in the axial position of the rotor in the case will change the gap. A drive motor could be mounted in such a way that it can be moved on the axis of the rotor. Should a pressure sensor measure a rising trans-membrane pressure, position control means can be used. For example, the motor can be moved closer to the filtration device, which would decrease the gap, increase the shear rate, and decrease the Taylor number. Conversely, if the motor is moved away from the filtration device described above, the rotor moves toward the outlet port, increasing the gap, decreasing the shear rate and increasing the Taylor number.

In some embodiments, the filtration device can produce Taylor numbers ranging from about 1 to 1500, such as about 5, 10, 20, 30, 40, 50, 60, 70, 80, 90, 100, 150, 200, 300, 400, 500, 1000, 1100, 1200, 1300, and 1400. In some embodiments, the filtration device can produce a shear rate ranging from about 5000 to 300000 l/s, such as about 6000, 7000, 8000, 9000, 10000, 15000, 20000, 25000, 30000, 35000, 40000, 45000, 50000, and 100000 (l/sec). Preferably, the filtration device can produce a Taylor number of about 52 at the inlet and a shear rate of about 33,075 l/sec. A gap of 0.005 at the outlet can produce a shear rate of 60,079 l/sec. Other gaps can be used to produce different shear rates as well.

Example Usage of the Filtration System in a Home

In some embodiments, a reservoir can be sized to complement a household's use of water. Contemporary toilets use approximately 1.6 gallons per flush. Generally, at least 16 gallons of water per person per day can be used for flushing toilets. Therefore, a family of four may use about 64 gallons per day of gray water to operate their toilets. Additionally, typical bathroom sinks put out about 2.5 gallons per minute. Typical bathroom showers put out about 3.3 gallons per minute. A ten minute shower and two minute shave can generate about 38 gallons of gray water. Therefore, a family of four can generate about 152 gallons of gray water just getting ready to face the day, providing ample waste gray water for toilet flushing. While a reservoir can be sized to receive and hold any volume of water, any excess waste gray water can be diverted to the sewer, or it can be filtered and used for irrigation. Embodiments of a filtration device described above can be sized and configured to provide at least two times this amount of filtered gray water, assuming the filtration device operates continuously, 24 hours/day. The throughput capacity of the filtration device is at least about 330 ml/min, or about 132.5 gallons per day. In other embodiments, the capacity of the filtration device can be about 100 ml/min, 200 ml/min, 300 ml/min, 400 ml/min, etc. The capacity of the filtration device is not limiting.

In typical households, there are busy times (mornings and evenings) when most of the waste water may be created. Therefore, the reservoirs can be sized and configured to be able to handle the busy times during the day. During the quiet times, the filtration device can continue to operate to process the gray water. Advantageously, by using reservoirs to store filtered gray water, particularly sized to hold water from a full day or more, the throughput needs of the filtration device can be reduced, thus reducing its size and cost. In exchange, the filtration device can run more or less continuously between the busy times, storing up the volumes needed for toilets.

The examples listed above describe using a filtration device for a single household. However, the filtration device, as well as the other components, can be sized and configured to handle much larger or much smaller buildings, as well as groups of buildings. The filtration system could come in various sizes with various capacities, which are not limiting. Any number of filtration devices, sensors, reservoirs, pumps, etc., can be used in any number of combinations to provide filtered gray water to a community.

Those skilled in the art will appreciate that numerous changes and modifications may be made to the preferred embodiments of the disclosure and that such changes and modifications may be made without departing from the spirit of the disclosure disclosed herein. It is therefore intended that the appended claims cover all such equivalent variations as may fall within the true spirit and scope of the disclosure.

What is claimed is:

1. A method for the filtration of gray water, comprising:
   collecting gray water;
   transporting the gray water into a Taylor vorticity filtration device comprising:
   a housing comprising a removable cap, an inlet port, a retentate output port and a filtrate output port;
   a removable filter assembly comprising a filter media and a substrate and one or more circumferential seals, wherein the removable filter assembly is disposed along at least a portion of an inner wall of the housing;
   a rotor coupled to a rotational drive means, and configured to rotate within the housing; and
   a gap between the removable filter assembly disposed along at least the portion of the inner wall of the housing and the rotor, such that rotation of the rotor within the housing generates Taylor vortices within the gap;
   filtering the gray water while rotating the rotor within the housing; and
   transporting the filtered gray water to a fixture, reservoir, or system configured to utilize or store the filtered gray water.

2. The method of claim 1, wherein the gray water, the filtered gray water, or both are transported using gravity, pumping or both.

3. The method of claim 1, further comprising transporting the collected gray water to a reservoir prior to transporting the gray water into the Taylor vorticity filtration device.

4. The method of claim 1, further comprising monitoring a property of the filtered gray water.

5. The method of claim 1, further comprising using controller-actuated valves with optional pumps to distribute the filtered gray water among one or more toilet fixtures and irrigation conduits.

6. The method of claim 5, wherein the controller is programmed to prioritize filtered gray water allocation among end uses.

7. The method of claim 5, wherein the controller is programmed to supplement the filtered gray water with an amount of fresh water sufficient to meet an end use demand.

* * * * *

UNITED STATES PATENT AND TRADEMARK OFFICE
CERTIFICATE OF CORRECTION

PATENT NO. : 9,790,100 B2  
APPLICATION NO. : 14/555319  
DATED : October 17, 2017  
INVENTOR(S) : Don Schoendorfer Page 1 of 1

It is certified that error appears in the above-identified patent and that said Letters Patent is hereby corrected as shown below:

In the Specification

In Column 13 at Line 26 (approx.), Change "1/sec." to --1/sec.--.

In Column 13 at Line 40, Change "1/sec." to --1/sec.--.

In Column 13 at Line 41, Change "1/sec." to --1/sec.--.

In Column 13 at Line 41, Change "1/sec." to --1/sec.--.

In Column 13 at Line 42, Change "1/sec." to --1/sec.--.

In Column 14 at Line 27, Change "1/s," to --1/s,--.

In Column 14 at Line 29, Change "(1/sec)." to --(1/sec).--.

In Column 14 at Line 31, Change "1/sec." to --1/sec.--.

In Column 14 at Line 32, Change "1/sec." to --1/sec.--.

Signed and Sealed this  
Twentieth Day of February, 2018

Andrei Iancu  
*Director of the United States Patent and Trademark Office*